(12) United States Patent
Kumar et al.

(10) Patent No.: US 12,319,325 B2
(45) Date of Patent: Jun. 3, 2025

(54) SYSTEMS AND METHODS FOR OPERATING A VEHICLE SYSTEM

(71) Applicant: Transportation IP Holdings, LLC, Norwalk, CT (US)

(72) Inventors: Ajith Kuttannair Kumar, Ashburn, VA (US); Brian Nedward Meyer, Fairview, PA (US)

(73) Assignee: Transportation IP Holdings, LLC, Norwalk, CT (US)

( * ) Notice: Subject to any disclaimer, the term of this patent is extended or adjusted under 35 U.S.C. 154(b) by 195 days.

(21) Appl. No.: 18/151,121

(22) Filed: Jan. 6, 2023

(65) Prior Publication Data

US 2023/0150555 A1 May 18, 2023

Related U.S. Application Data

(63) Continuation-in-part of application No. PCT/US2021/042909, filed on Jul. 23, 2021.

(60) Provisional application No. 63/055,593, filed on Jul. 23, 2020.

(51) Int. Cl.
| | |
|---|---|
| *B61H 13/00* | (2006.01) |
| *B61L 99/00* | (2006.01) |

(52) U.S. Cl.
CPC ............ *B61H 13/00* (2013.01); *B61L 99/002* (2024.01); *B61L 2201/00* (2013.01)

(58) Field of Classification Search
CPC ..... B61H 13/00; B61L 27/04; B61L 2201/00; B61L 15/0058; G08G 1/22; B60W 10/18
See application file for complete search history.

(56) References Cited

U.S. PATENT DOCUMENTS

| | | | |
|---|---|---|---|
| 4,852,007 A | 7/1989 | Yasunobu et al. | |
| 9,610,948 B2 | 4/2017 | Kumar et al. | |
| 2016/0362022 A1* | 12/2016 | Mathews, Jr. | ......... G01C 21/26 |
| 2017/0129511 A1* | 5/2017 | Crane | ................. B61L 15/0036 |
| 2018/0137763 A1* | 5/2018 | Deragården | ......... G05D 1/0295 |
| 2018/0322791 A1* | 11/2018 | Brooks | ............... B61L 15/0072 |
| 2020/0139945 A1 | 5/2020 | Schoenly et al. | |

FOREIGN PATENT DOCUMENTS

| | | |
|---|---|---|
| JP | 2006232210 A | 9/2006 |
| WO | 2009120521 A1 | 10/2009 |
| WO | 2013081792 A1 | 6/2013 |

OTHER PUBLICATIONS

International Search Report and Written Opinion for corresponding application No. PCT/US2021/042909 dated Nov. 5, 2021 (15 pages).

* cited by examiner

*Primary Examiner* — James M McPherson
*Assistant Examiner* — Kyle J Kingsland
(74) *Attorney, Agent, or Firm* — K&L Gates LLP

(57) ABSTRACT

A system and method includes commencing movement of a vehicle system including a plurality of vehicles from a stationary state. Operation of the vehicle system is controlled to control spacing between the vehicles of the vehicle system.

18 Claims, 6 Drawing Sheets

SYSTEMS AND METHODS FOR OPERATING A VEHICLE SYSTEM

CROSS REFERENCE TO RELATED APPLICATION

This application is a continuation-in-part of PCT Application No. PCT/US21/042909, filed 23 Jul. 2021, which claims priority to U.S. Application 63/055,593, filed 23 Jul. 2020. The entire contents of these applications are incorporated herein by reference.

BACKGROUND

Technical Field

Embodiments disclosed herein relate to methods and systems for operating a vehicle system.

Discussion of Art

Large vehicles and vehicle systems that include a plurality of vehicles may be difficult to start and stop due to the size and/or number of vehicles in the vehicle system.

Vehicle systems may include one or more off-highway vehicles (e.g., rail vehicles, mining vehicles, agricultural vehicles, or other vehicles that may be not designed or legally permitted for travel on public roadways), marine vessels, automobiles, on-road trucks, aircraft, or the like. Vehicle systems may also be formed from a single vehicle instead of multiple vehicles. A rail vehicle system, for example a freight train, uses multiple locomotives in the consist that may be distributed at various positions along the consist to control the train forces, improve train handling, and reduce fuel consumption. These locomotives can produce motoring/propulsion power at various levels depending on the operator command to increase the speed of the train. Similarly, dynamic braking on each of the locomotives can be used to slow the train or to prevent the speed from increasing or to control the rate of change of speed. Some of the systems with dynamic braking have limited or no capability at zero or close to zero speed. Non-powered vehicle air brakes (e.g., train brakes) utilizing the air brake system on each of the vehicles can be used to slow the train.

There are generally two types of airbrake systems in use, namely standard air brakes and electronically controlled pneumatic (ECP) air brakes. In the former, control and actuation are through the brake pipe airbrake pressure. In the ECP system the control is communicated through electrical signals and recharge is through airbrake brake pipe pressure. A bail off function is provided in the lead locomotive to decouple the non-powered vehicle air brakes from the locomotive, or independent, brakes and to allow the brakes to function on the railcars.

There are multiple limitations in applying and releasing airbrakes due to communications and pressure recharging times. A control system can control motoring power, dynamic brake power and consist/distributed power (DP). The air brake related controls are done manually even if the controller provides guidance to an operator. At any time there may be thousands of trains all of which can be configured uniquely. The locomotives and cars are routinely interchanged based on the freight traffic needs and destinations. In addition, cars and locomotives are picked up and set out on routes, unlike unit (e.g., passenger) trains where the train configuration remains the same over long periods of time.

Starting and stopping of a heavy vehicle system may be difficult due to, for example, unknown slack states, different grades within the vehicle system, propagation delay of the airbrakes, coupler limitations, and/or adhesion conditions. The difficulty of stopping a heavy vehicle system also may be compounded due to the nature of stopping at a particular location(s) or at a given slack state to facilitate restarting. It may be desirable to have a system and method that differs from those that are currently available.

BRIEF DESCRIPTION

In accordance with one example or aspect, a method includes commencing movement of a vehicle system including a plurality of vehicles from a stationary state and controlling one or more brakes of the vehicle system during the commencement of movement of the vehicle system from the stationary state to control spacing between the plurality of vehicles of the vehicle system.

In accordance with one example or aspect, a method includes commencing movement of a vehicle system including a plurality of vehicles from a stationary state. The plurality of vehicles are arranged in one or more groups of propulsion-generating vehicles. The method includes individually controlling the one or more groups of propulsion-generating vehicles of the vehicle system during the commencement of movement of the vehicle system to control spacing between the plurality of vehicles of the vehicle system.

In accordance with one example or aspect, a vehicle control system includes one or more processors that control operation of brakes of a vehicle system including a plurality of vehicles to commence movement of the vehicle system. The processors control operation of the brakes to control spacing between the plurality of vehicles of the vehicle system.

BRIEF DESCRIPTION OF THE DRAWINGS

The inventive subject is disclosed in the following description of non-limiting embodiments, with reference to the attached drawings, wherein below.

DETAILED DESCRIPTION

Figure 1:
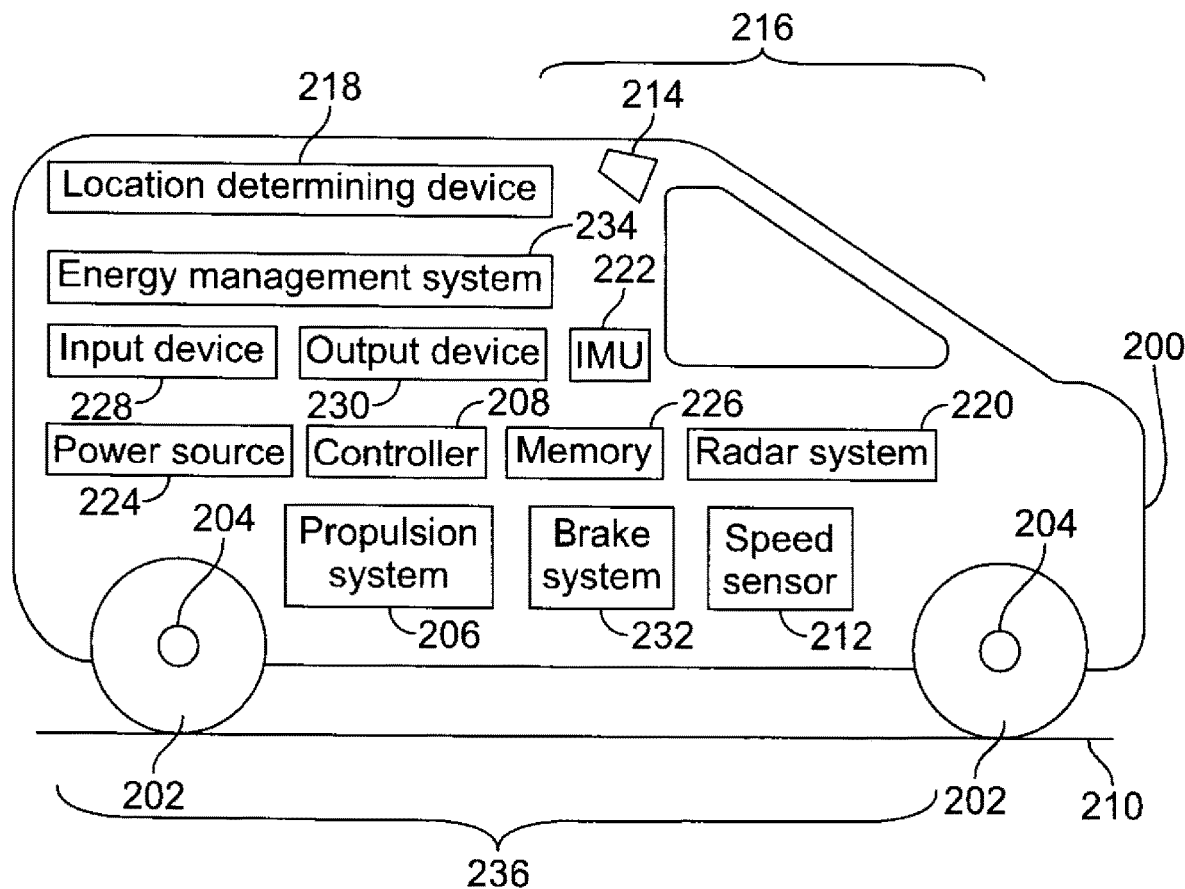
FIG. 1 schematically illustrates a vehicle system according to one embodiment.

Embodiments of the subject matter described herein relate to control systems and methods for controlling movement of a vehicle system. The movement to be controlled may be stopping movement of the vehicle system, slowing movement of the vehicle system, starting movement of the vehicle system. Optionally, the control systems may control the starting, slowing, and/or stopping of different segments of the vehicle system (e.g., at different times, at different locations, at different acceleration and/or braking rates, or the like). The systems and methods allow for starting the vehicle system from a starting state in which the vehicles are stopped. These vehicles may be bunched together, stretched apart, or a combination with some bunched together while others are stretched apart. The systems and methods also allow for control of forces on couplers, if present, that may couple the vehicles together in a vehicle system that has the vehicles mechanically coupled with each other.

While one or more embodiments are described in connection with a rail vehicle system, not all embodiments are limited to rail vehicle systems. Unless expressly disclaimed or stated otherwise, the inventive subject matter described herein extends to multiple types of vehicle systems. These vehicle types may include automobiles, trucks (with or without trailers), buses, marine vessels, aircraft, mining vehicles, agricultural vehicles, or other off-highway vehicles. The vehicle systems described herein (rail vehicle systems or other vehicle systems that do not travel on rails or tracks) can be formed from a single vehicle or multiple vehicles. With respect to multi-vehicle systems, the vehicles can be mechanically coupled with each other (e.g., by couplers) or logically coupled but not mechanically coupled. For example, vehicles may be logically but not mechanically coupled when the separate vehicles communicate with each other to coordinate movements of the vehicles with each other so that the vehicles travel together as a group. Vehicle groups may be referred to as a convoy, consist, swarm, fleet, platoon, and train.

With regard to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included.

With respect to energy sources that can provide electric energy (e.g., direct and/or alternating current) to one or more loads, the energy sources may include one or more fuel cells. Suitable fuel cells may include a solid oxide fuel cell (SOFC), a proton exchange membrane (PEM) fuel cell, an alkaline fuel cell, direct methanol, fuel cell, molten carbonate fuel cell, and an acid fuel cell. Suitable acid fuel cells may include solid acid and phosphoric acid fuel cells. Examples of suitable fuel cell electrodes may include a catalyst containing platinum and ruthenium; or a catalyst containing titanium tungsten oxide nanoparticles that are coated with a layer of platinum. A suitable polymer membrane may be Nafion, which is commercially available from Du Pont, or expanded porous polytetrafluoroethylene (ePTFE).

The control systems and methods may allow the vehicle system to start while located on differing terrain features. These terrain features may include flat, uphill, downhill, curved, and/or undulating terrain features. In one embodiment, the vehicle system may be an aerial or marine vehicle such that "terrain feature" may include wind or water currents, shallows, and the like. Of note is that while on a particular terrain feature, e.g., a hill, orientation of the vehicle determines whether the vehicle is starting uphill, downhill, or at some other angle relative to the grade. The systems and methods may provide an operator of the vehicle system with information during the starting operation to allow the operator to either end the starting operation or take over the starting operation if any problems occur or if the starting operation will not be completed correctly. Stated differently, the systems and methods can switch from automatic to manual control if any problems occur or if the starting operation will not be completed correctly.

Embodiments of the subject matter described herein relate to systems and methods for starting and/or stopping movement of a vehicle system. A suitable vehicle system may include a plurality of vehicles that are mechanically coupled together in one embodiment, or that are not mechanically coupled with each other but are virtually, logically or communicatively coupled together. The systems and methods allow for the vehicle system to be stopped at a location and in a state that sets up the vehicle system to be started again in a manner that reduces possible damage to the vehicle system (relative to stopping the vehicle system in another state). The systems and methods also allow for the vehicle system to be stopped so that the location of the front of the vehicle system in relation to the end of the vehicle system is known and that prevents the front of the vehicle system from going beyond a specified location and/or the end of the vehicle system from extending into a route of another vehicle system. For example, the control systems and methods can operate to stop a vehicle system with the end or trailing vehicle passing through an exiting an intersection between routes so that the vehicle system does not block the intersection.

Referring to FIG. 1, a vehicle system 200 according to one embodiment is shown as a single vehicle. A suitable single vehicle may be a single automobile, rail vehicle, off-highway vehicle, marine vessel, airplane, or the like. In other embodiments, the vehicle may be part of a vehicle system and may include two or more vehicles. Suitable multiple vehicle systems may include a rail vehicle consist, train, convoy of multiple automobiles or on-road trucks, drones and swarms of autonomous and semi-autonomous vehicles, and the like (collectively a vehicle system or vehicle group). Vehicles may join or leave the vehicle system. That is, vehicle groups may have static membership in one embodiment but may have dynamic membership in other embodiments in which individual (or subgroups of) vehicles may enter and/or leave the vehicle group. As noted above, in vehicle system including multiple vehicles, the vehicles in the vehicle system may be mechanically and/or communicatively coupled. Optionally, the vehicle system may have multiple vehicles that are not mechanically coupled with each other, but that communicate with each other or another system to coordinate movements of the vehicles for the vehicles to travel together as a vehicle system. Communicatively coupled vehicles may be part of a mesh or other network. A vehicle may communicate with other vehicles in the vehicle system, wayside equipment, communication systems (e.g., cell towers or satellites), and back-office systems. Vehicle to vehicle communication may be done directly, with or without a hopper or booster, or indirectly through a communication system.

In one embodiment, a vehicle can include two or more wheels 202 connected with axles 204. The axles and wheels may be rotated by a propulsion system 206. The propulsion system can include one or more power sources 224 (e.g., an engine with a generators or alternator, fuel cell, batteries, capacitors, flywheels, etc.), or the like. The power source couples to a motor that can generate torque to rotate the axles and/or the wheels. The propulsion system can include gears, gear boxes, shafts, or the like, that connect and translate work performed by the propulsion system into rotation of the axles and/or the wheels. Optionally, a power source for providing power to one or more motors of the propulsion system may be provided outside of (e.g., not included in) the propulsion system. External power sources may include, for example, a catenary line or third rail. In one embodiment, the power source may power one or more additional components of the vehicle. In one embodiment, the vehicle system includes a marine vehicle, and the propulsion system may include one or more power sources and/or one or more motors that can generate torque to rotate one or more propellers or one or more impellers. In one embodiment the vehicle system includes an aircraft, and the propulsion system may include one or more power sources and/or one or more motors that can generate torque to rotate one or more propellers or one or more fans.

The propulsion system may control the amount of torque applied to different wheels, propellers, impellers, or fans. In one embodiment, the torque may be applied to the wheels (or axles) independently of each other. For example, a controller 208 or control system of the vehicle system can generate signals that cause the propulsion system to generate and apply more torque to one axle than another axle at the same time. The propulsion system may include motors connected to different axles in order to apply the different torques to the axles. The controller can represent hardware circuitry that includes and/or is connected with one or more processors, microcontrollers, or other electronic logic-based devices.

A movement detection system 236 may include one or more of the controllers, a speed sensor 212, a radar system 220, an inertial measurement unit (IMU) 222, a sensor 214 (in the illustrated embodiment the sensor is a camera), a location determining device 218, a memory 226, and/or one or more propulsion systems of the vehicle.

A movement characteristic of the vehicle can be monitored by the movement detection system. This movement characteristic can include rotational displacement of one or more components of the vehicle, such as the rotational displacement of a wheel and/or an axle and/or motor. The controller can determine whether and/or how far one or more wheels rotate to determine whether the vehicle is moving (as described below). In one embodiment, the speed sensor can output a displacement signal representative of how far a wheel and/or an axle has rotated. The speed sensor can include a tachometer that generates signals representative of how far the wheel or the axle has rotated. If the speed sensor is connected to the motor the gear ratio may be considered.

Additionally, or alternatively, the movement characteristic of the vehicle that can be monitored can include optical characteristics of images and/or video. The vehicle can include a camera located onboard the vehicle. The camera can obtain images and/or video during operation of the vehicle. As described below, these images and/or video can be monitored for changes to determine if the vehicle has begun moving from a stationary state.

The camera may be located inside the vehicle such that a field of view of the camera includes part of the inside of the vehicle. For example, the camera may be located in and/or have a field of view that includes at least part of an operator cab 216 of the vehicle. The operator cab represents a space inside the vehicle where an operator is located to control operations of the vehicle. The field of view of the camera may include a window or other light transmissive portion of the vehicle such that the field of view includes one or more areas outside of the vehicle. Optionally, the camera may be located on an exterior surface of the vehicle. Other video and optical devices that may be suitable may use non-visible radiation spectrums (e.g., UV and IR). Other suitable sensors may include other optical systems, radar, lidar, microwaves, radio signals, and the like. In one embodiment, a time-of-flight (TOF) system may be used as an alternative or an addition to other optical sensors and cameras.

Additionally, or alternatively, the movement characteristic of the vehicle that is monitored can include vehicle displacement. The vehicle displacement represents how far the vehicle has moved. In one embodiment, the vehicle displacement may be unidirectional vehicle displacement. Unidirectional refers to the distance that the vehicle has moved in a single direction (e.g., and not in any other directions). For example, only displacement along a single direction may be monitored, such as the direction along which the route 210 extends. In alternative embodiments, multi-axis movement and vectors may be used.

The vehicle can include the location determining device that generates location data representative of where the vehicle is located, a speed of the vehicle, a heading of the vehicle, or the like. The location determining device can include a global navigation satellite system (GNSS) receiver, such as a global positioning system (GPS) receiver. Additionally, or alternatively, the location determining device can include another device, such as a wireless transceiver that communicates with cellular towers (e.g., to triangulate the location of the vehicle). The location determining device can determine a location of where the vehicle is located based on wireless signals received from sources outside of the vehicle (e.g., GNSS satellites, cellular towers, or the like). The location determining device may generate location data representative of this location and communicate the location data to the controller. This location data can include geographic coordinates of the location determining device or other information representative of where the vehicle is located.

The controller may receive different location data from the location determining device at different times. The location data may change over time due to movement of the vehicle, but potentially due to drift in signals received by and/or generated by the location determining device, due to tolerances of the location determining device in determining the coordinates, due to external interference, or the like. In one embodiment, the controller may examine only the location data representative of movement along a single direction. For example, the controller may examine changes in the location data along a first direction (e.g., a direction that is parallel to a latitude of the earth, a direction that is parallel to a longitude of the earth, a direction that is obliquely oriented with respect to a latitude and/or longitude of the earth, a direction that extends along a segment of the route, or the like). This direction may be referred to as a movement direction of interest. The controller may ignore changes in the location data representative of movement along any other direction. Optionally, the location determining device may communicate the location data or changes in the location data along the movement direction of interest to the controller, and not communicate location data or changes in the location data along other directions.

Additionally, or alternatively, the movement characteristic of the vehicle that is monitored can include a separation distance and/or a time-of-flight. The separation distance can be a distance between the vehicle and one or more objects located outside of the vehicle. The time-of-flight can be a time period during which one or more electromagnetic waves are emitted toward the one or more objects located outside of the vehicle and reflected or backscattered echoes of the waves are received back at the vehicle. The vehicle can include the radar system that transmits electromagnetic waves outside of the vehicle (e.g., toward the ground, toward the route, toward objects disposed along the route, or the like).

The radar system can measure a time-of-flight as the time between emitting one or more electromagnetic waves and the time at which the one or more electromagnetic waves are received back at the radar system. The radar system can include one or more antennas and associated hardware circuitry that transmits and receives the waves. The hardware circuitry of the radar system optionally may include and/or be connected with one or more processors, microcontrollers, or other electronic logic-based devices. The radar system can communicate the time-of-flight information to the controller and/or may convert the time-of-flight information into a separation distance between the radar system and the object off which the waves were at least partially reflected. This separation distance can be communicated to the controller. Optionally, the controller can determine the separation distance based on the time-of-flight that is reported to the controller from the radar system.

Additionally, or alternatively, the movement characteristic of the vehicle that is monitored can include inertia of the vehicle. The vehicle can include one or more IMUs or other devices that measure inertia of the vehicle and/or changes in the inertia of the vehicle. The IMU may generate inertial data that represents one or more of an orientation of the vehicle, a velocity of the vehicle, and/or a gravitational force. This inertial data may be communicated to the controller as the movement characteristic. Suitable alternatives to the IMU shown in FIG. 1 may be an accelerometer and/or gyroscope, that are not an IMU.

In one embodiment, the movement characteristic of the vehicle that is monitored is rotational displacement of one or more components of the vehicle. The rotational displacement of the one or more components may be examined in order to determine if the vehicle has begun moving from a stationary state. The controller can examine the rotational displacement measured by the speed sensor for one or more wheels and/or axles of the vehicle. Merely measuring rotational displacement of a wheel and/or axle may not accurately determine whether the vehicle has initiated movement. For example, if adhesion between the wheel and a surface of the route being traveled upon by the vehicle is poor, then the wheel may slip relative to the surface of the route. This slipping can cause the wheel to rotate without the vehicle actually moving along the route. In order to prevent the slipping of a wheel from being incorrectly identified as initiation of movement of the vehicle, the movement characteristic of rotational displacement of a wheel and/or axle can be examined by reducing the torque or tractive effort (TE) applied to a first axle or a first wheel relative to one or more, or all, other axles and/or wheels of the same vehicle system (where the vehicle system includes two or more vehicles). This first axle or first wheel may be referred to as a de-rated axle or de-rated wheel. The torque or tractive effort may be reduced below a lower threshold that is associated with wheels not slipping on the route. The lower threshold may be determined from previous observations of the vehicle system, such as by examining the wheels at different torques or tractive efforts to determine which torques or tractive efforts cause slipping of the wheels.

The controller can then determine the rotational displacement of the de-rated wheel or axle based on a signal output by the speed sensor. If or when the controller receives signals from the same or other speed sensors for other wheels or axles, the controller can disregard or not use those signals to monitor the movement characteristic (e.g., rotational displacement) of the vehicle. The torque or tractive effort applied to the de-rated axle or wheel may then be increased for movement of the vehicle. In one embodiment, the controller may repeatedly determine the rotational displacement of the de-rated wheel and/or de-rated axle. The controller can monitor the same wheel or axle as the de-rated wheel or axle or may use different wheels or axles at different times as the de-rated wheel or axle.

If the de-rated wheel and/or axle has rotated (e.g., due to the commencement of movement of the vehicle), then the rotational displacement (e.g., a distance measurement) received from the speed sensor will change. If the de-rated wheel and/or axle has not rotated (e.g., due to the vehicle remaining stationary), then the rotational displacement received from the speed sensor will not change or will change by a small amount (e.g., less than a designated threshold representative of noise in the system or speed sensor).

Additionally, or alternatively, to de-rating an axle and/or wheel to measure the rotational displacement, a throttle of the vehicle may be limited. The throttle may be included in or represented by the input device shown in FIG. 1. Limiting a throttle can include preventing an operator or autonomous control of the throttle from increasing the throttle above a designated reduced throttle limit. The reduced throttle limit can be an upper limit on the throttle that is smaller than an upper or maximum range of the throttle. For example, prior to limiting the throttle of the vehicle, the throttle may have a range of positions or settings from one to eight (representing different tractive efforts, torques, speeds, or the like). Optionally, the throttle may include a pedal that has a range of movement.

The rotational displacement of two or more different axles and/or wheels of the same vehicle (or same vehicle unit where the vehicle includes two or more vehicles) may be compared to determine if the vehicle has begun moving from a stationary position. For example, the rotational displacement of the de-rated axle or wheel may be compared with the rotational displacement of one or more axles and/or wheels that were not de-rated. If the rotational displacement of the axles and/or wheels that were not de-rated is larger than the rotational displacement of the de-rated axle and/or wheel, then the larger rotational displacement may indicate that the axles and/or wheels that were not de-rated is due to slipping of the wheels on the route while the smaller rotational displacement of the de-rated axle and/or wheel may indicate that the vehicle has not yet begun to move (e.g., if this rotational displacement is small, such as less than a threshold distance of three centimeters, six centimeters, ten centimeters, fifty centimeters, or another value). In one embodiment, the threshold distance may be a non-zero distance and non-negative distance. Alternatively, the threshold distance has a value of zero. But, if the rotational displacement of the de-rated axle and/or wheel is greater than this threshold distance, then the rotational displacement may indicate that movement of the vehicle has begun.

The controller can control operations of the vehicle in the moving mode according to a trip plan. An energy management system 234 can designate operational settings of the vehicle as a function of time, distance, and/or location along routes. These operational settings may include throttle settings, brake settings of a brake system 232 of the vehicle (e.g., an air brake system, dynamic brakes, independent brakes, disc brakes, or the like), speeds of the vehicle, or the like. The operational settings of the trip plan may be used to instruct the operator on how to control the vehicle, such as by displaying or audibly presenting instructions on an output device 230. The output device can include a display device, speaker, or the like. Alternatively, the vehicle may be directly controlled (e.g., autonomously) using the operational settings designated by the trip plan. For example, the controller, the propulsion system, the brake system, or the like, may be autonomously controlled according to the operational settings designated by the trip plan. The controller may directly control the throttle of the propulsion system and/or the brake system without operator intervention during operation of the vehicle in the moving mode only, in the transitional operating mode only, or in both the moving mode and the transitional operating mode.

Figure 2:
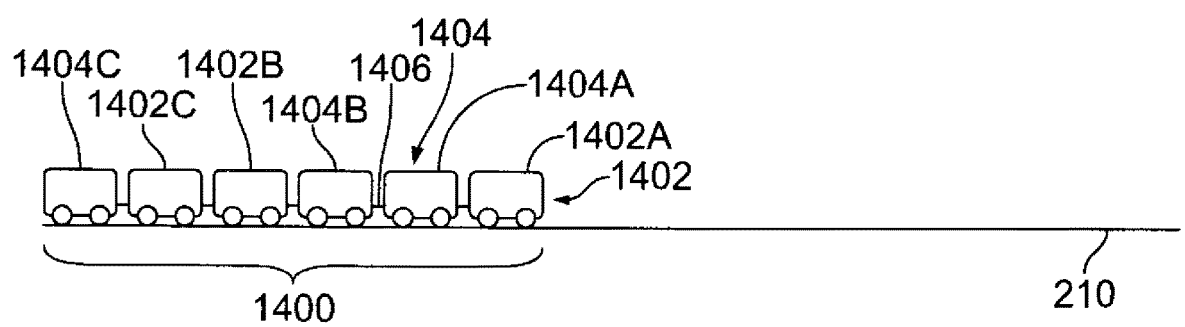
FIG. 2 schematically illustrates a vehicle system according to one embodiment.

FIG. 2 illustrates a vehicle system 1400 according to one embodiment. The vehicle system 1400 may represent the vehicle shown in FIG. 1, with the vehicle system including a single vehicle or multiple vehicles 1402 (e.g., units 1402A-C), 1404 (e.g., units 1404A-D) mechanically connected with each other by couplers 1406. The vehicles 1402 can represent propulsion-generating vehicles, such as locomotives, automobiles, off-highway vehicles (e.g., mining vehicles or other vehicles that are not permitted or designed for travel on public roadways), marine vessels, or the like. The vehicles 1404 can represent non-propulsion-generating vehicles, such as rail cars, trailers, or the like. The number and arrangement of the units 1402, 1404 in the vehicle system 1400 are provided merely as one example and are not limiting on all embodiments of the subject matter described herein. In one embodiment, the vehicle system may be a rail vehicle. The rail vehicle may include multiple propulsion-generating vehicles (locomotives) provided in groups distributed throughout the rail vehicle. Each group of propulsion-generating vehicles may include a single propulsion-generating vehicle (locomotive) or a plurality of propulsion-generating vehicles (locomotives).

Alternatively, two or more of the vehicles may not be mechanically coupled with each other. For example, two or more of the vehicles or all of the vehicles may be separate from each other but may travel together as a group (or a convoy, platoon, etc.) along the route. The components shown onboard the vehicle of FIG. 1 may be disposed onboard a single vehicle unit and/or may be split among the vehicles of the vehicle system.

In one embodiment, an operating mode of the vehicle system can include stopping the vehicle system such that multiple vehicles of the vehicle are bunched together with one or more couplers between the multiple vehicles being in a slack state once the vehicle system is stopped. The slack state can include the couplers having slack, such as that occurring when the couplers are not in tension.

The couplers may absorb longitudinal forces between the vehicles of the vehicle system. As the vehicle system moves, longitudinal compression and tension forces shorten and lengthen the distance between the vehicles. The couplers may allow for some free movement or slack of a first vehicle unit before the force is exerted on a second vehicle unit that is coupled to the first vehicle unit. When the coupler between two vehicles is not under tension (or the tension in the coupler has a magnitude below a designated threshold), the coupler may be referred to as being in a slack state or slack condition. The slack state is in comparison to a stretch state of the coupler when the tension in the coupler has a magnitude greater than a designated threshold. In one embodiment, the couplers of the vehicle system are in the slack state when the vehicle system is stopped because, when the vehicle system starts moving again, the propulsion-generating vehicles may not need to pull the entire load of the vehicle system from the stationary position at the same time. Instead, due to the accumulation of slack between the vehicles (also referred to as bunching), the propulsion-generating vehicles may start by pulling and/or pushing a smaller number of the non-propulsion-generating vehicles until the slack between the vehicles is reduced, at which time the propulsion-generating vehicle unit pushes and/or pulls additional vehicles. Due to bunching, the propulsion-generating vehicles may be able to build up momentum over time without having to pull the entire load of the vehicle system at once from a stopped position.

To stop the vehicle system such that multiple vehicles of the vehicle system are bunched together the energy management system may designate operational settings (e.g., according to a trip plan) and/or the controller may limit or constrain changes to throttle settings that provide for fine control over the tractive efforts and braking efforts of the vehicle system as the vehicle system slows to a stop in order for the couplers to attain the slack state. For example, the operational settings may control the braking system to slow the vehicles consecutively such that each vehicle unit comes to a stop soon or very close after the preceding vehicle unit in the vehicle system (e.g., within one to three meters or another distance), which can provide slack in the corresponding coupler. The controller and/or energy management system may designate the operational settings based on slack information received from string pots located between the vehicles. Due to the benefit that bunching may provide the vehicle system as the vehicle system starts moving again, stopping the vehicle system to achieve bunching may be more desirable than stopping the vehicle system to achieve fuel efficiency or to save time, for example.

With regard to the fuel, the fuel may be a single fuel type in one embodiment and in other embodiments the fuel may be a mixture of a plurality of different fuels. In one example of a fuel mixture, a first fuel may be liquid and a second fuel may be gaseous. A suitable liquid fuel may be diesel (regular, biodiesel, HDRD, and the like), gasoline, kerosene, dimethyl ether (DME), alcohol, and the like. A suitable gaseous fuel may be natural gas (methane) or a short chain hydrocarbon, hydrogen, ammonia, and the like. In one embodiment, fuel may be inclusive of stored energy as used herein. In that perspective, a battery state of charge, or a source of compressed gas, a flywheel, fuel cell, and other types of non-traditional fuel sources may be included.

In one embodiment, the energy management system may start the vehicle system by controlling motoring, dynamic brake, DP operation, independent air brake and automatic air brake operation. The energy management system may start the vehicle system without first determining or calculating the slack state of the vehicle system and/or the terrain conditions. The energy management system may start the vehicle system without any significant backward movement which may occur if one or more vehicles moves in a direction opposite to the overall direction of movement of the vehicle system, without reaching coupler limits anywhere in the vehicle system, and without damaging the route. In addition, the energy management system should be able to hand over the control to the operator at any time and not leave the vehicle system in an unsafe condition. The vehicle system starting operation may be performed under any slack condition (stretched, bunched, indeterminate) in the vehicle system as well as different grades (example uphill, downhill, undulating), route conditions (example dry, wet, snow), and weight distributions.

Figure 3:
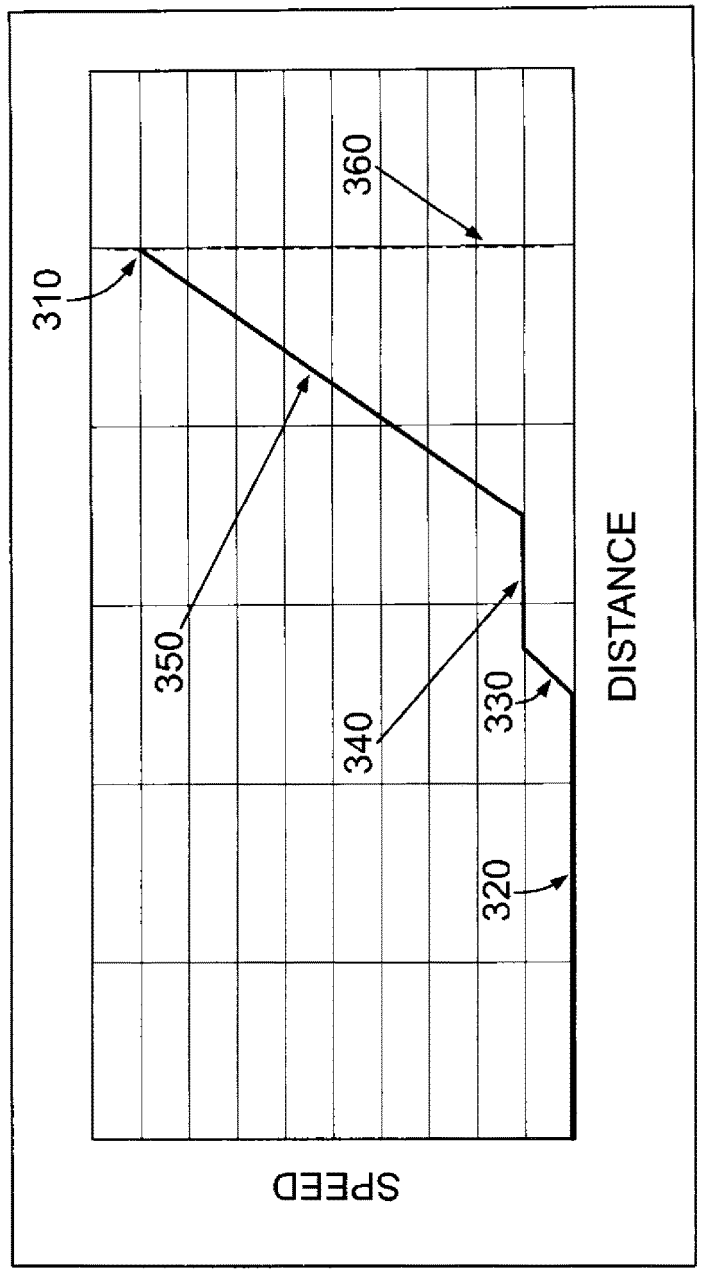
FIG. 3 schematically illustrates regulation of a speed of a vehicle system according to one embodiment.

Referring to FIG. 3, the speed of the vehicle system may be regulated during a starting process until the speed reaches a transition speed 310 at a distance 360 traveled by the vehicle system during the starting process. When the vehicle system reaches the transition speed control of the vehicle system may be according to the trip plan previously determined by the controller. In one embodiment, the controller may determine a new trip plan after reaching the transition speed. The speed regulation includes a first phase 320 in which the overall speed of the vehicle system is zero although the speed of one or more vehicles of the vehicle system is greater than zero. During the first phase the vehicle system may be stretched as distances between vehicles increases.

As the starting process continues the vehicle system enters a second phase 330 in which the vehicles of the vehicle system accelerate. The speed regulation continues to a third phase 340 to force all vehicles into motion or to minimize slack forces, in which all of the vehicles of the vehicle system are moving, and the speed of the vehicle system is regulated to be a substantially constant speed. The speed regulation continues to a fourth phase 350 in which the vehicle system accelerates to the transition speed.

The length of each phase of the starting process and the speed and acceleration of the vehicle system in each phase may be determined and transitioned through based upon the slack state of the vehicle system. The slack state may be stretched, bunched, indeterminate, or partially indeterminate, and can be used to determine how to manipulate each phase of the starting process. The slack state can be pre-calculated or based upon the previous stop process and carrying it over to the next starting process, i.e., stop in a determined slack state and pass it forward. Additionally, other data sources can contribute to combine different starting process manipulations such as vehicle system makeup including coupler types and positions, length of vehicle system, individual vehicle (e.g., car) length and weights, and terrain data that the vehicle system is sitting on. These can all be combined to determine different processes to start the vehicle system including, but not limited to: stretched uphill, stretched downhill, stretched undulating, bunched uphill, bunched downhill, bunched undulating, or an unknown slack state.

DP can be used to force a starting slack state, by individual manipulation of when and how to apply power to individual propulsion-generating vehicles within the vehicle system. In one embodiment, a starting slack state is provided by pushing from a rear DP propulsion-generating vehicle group and holding a lead propulsion generating-vehicle group to force the vehicle system into a bunched state. Consequently, individual airbrake systems per propulsion-generating vehicle group within the vehicle system may be controlled to allow application of propulsion-generating vehicle air brakes on the rear or lead propulsion-generating vehicle group while releasing the air brakes on the other propulsion-generating vehicle group. This allows manipulation of individual vehicle brakes utilizing ECP air brakes, by applying or releasing individual vehicle brakes.

Individual control of each propulsion-generating vehicle group can allow for timed transitions of tractive effort (TE) versus release of airbrakes to prevent rollback of individual vehicles, and simultaneously stretching of the vehicle system, as well as to use coordinated movement of individual propulsion-generating vehicles or groups of propulsion-generating vehicles in a DP vehicle system to prevent vehicles from rolling back to stretch, or to push vehicles to bunch the vehicles of the vehicle system. Each propulsion-generating vehicle group may be individually controlled. In one embodiment, the starting times of each individual propulsion-generating vehicle group may be staggered. For example, a lead propulsion-generating vehicle group may be started first and subsequent propulsion-generating vehicle groups may be started at a later time or times. The speeds and/or accelerations of the propulsion-generating vehicle groups may be individually controlled. In one embodiment, all the propulsion-generating vehicles groups may be started at the same time. For example, all of the propulsion-generating vehicle groups may be started at the same time but at different speeds and/or accelerations.

Other vehicle system and/or vehicle unit feedback can be used to modify the starting process. Such feedback can include, for example, End of Vehicle (EOV) feedback, including movement detection, and EOV brake pipe pressure, or change in pressure. Additionally, or alternatively, other data sources can alter the starting process such as vehicle system makeup, a position of the vehicle system on terrain, brake state, including propulsion-generating vehicle air brakes, non-propulsion-generating vehicle air brakes, hand brakes, and whether they are set, applying, released, releasing.

A starting process can include departure checks. For example, a departure check may include continuous brake pipe checks, brake pipe leakage checks, locomotive status, and/or train makeup confirmation. The departure check may include checks of brake pipe pressure rise (e.g., in PSI) at the end of the vehicle based upon EOV data, or DP propulsion-generating vehicle brake pipe status, as well as consist checks utilizing DP data, DP link status, and running status of individual locomotives based upon DB modem data, or DP in comparison with offboard train makeup data.

During the starting process, the vehicle system operator (e.g., train engineer) can be kept constantly informed of a status of the starting process, as well as reasons and process for start failure. The operator may be allowed to return the vehicle system to a stop state, and control returned to the operator in a safe state, or the operator may be allowed to take over at a failure state and to continue the starting process.

In one embodiment, a trip optimizer type system may be used to start a heavy vehicle system, for example a train, by controlling motoring, dynamic brake, DP operation, independent air brakes, and/or automatic air brakes regardless of the slack state and terrain conditions. The starting may be achieved without any significant backward movement of the vehicle system or vehicles in the vehicle system (i.e., without movement of any vehicles of the vehicle group moving in a direction opposite to an intended direction or a direction of interest), without reaching coupler limits anywhere in the vehicle system, and without damaging the route. In addition, control of the vehicle system may be handed over to the operator at any time and not leave the vehicle system in an unsafe condition. The vehicle system starting operation may be performed under determined or undetermined slack conditions (e.g., stretched, bunched, indeterminate) in the vehicle system as well as different route grades (e.g., uphill, downhill, undulating), track conditions (e.g., dry, wet, snow), and weight distributions.

The operator may be informed of the starting status and any problems that occur while the vehicle system is being controlled at all times during the starting operation. This may include informing the operator of each action being taken, e.g., release of the vehicle system air brakes, displaying what notch (i.e. throttle position or setting) the propulsion-generating vehicles are being driven at all times, failures and/or degradations encountered during the starting process (e.g. communication errors, TE production that is different from expected), operation of related equipment such as sanders, advance rail cleaners (ARC), crossing bell, horn, GPS receivers, and their status. The operator may be informed about specific events during the starting process, for example when movement of the entire vehicle system is confirmed, when a desirable slack condition is achieved (and what the condition is), when the vehicle system is transitioning to constant speed regulation operation, and/or when the starting process is being aborted and why and what condition the vehicle system is going to be left in upon aborting the starting process (e.g., an airbrake state). The output device may be used to confirm and/or inform the operator about an axle cutout status or engine shut down status or anything else which may prevent or impair starting.

When conditions required for starting are high, for example a high throttle position such as in the lead propulsion-generating vehicle, one or more axles, one or more propulsion systems, and/or one or more propulsion-generating vehicles may be controlled differently in order to increase or maximize adhesion and thereby to reduce or minimize wheel slip. The trailing propulsion-generating vehicles may have relatively better adhesion and may be able to compensate for the wheel slip of the lead propulsion-generating vehicle. In one embodiment, the controller may control one or more of the propulsion or dynamic braking differently, including directing one or more of the propulsion-generating vehicles closer to a trailing end of the vehicle system to generate more propulsion than one or more others of the propulsion-generating vehicles closer to an opposite leading end of the vehicle system. This can be done based on an adhesion profile of one or more similar vehicle systems, similar conditions, similar location and/or by the stopping performance of one or more similar vehicle systems. A profiled adhesion-based call may be used. For example, each axle may produce an additional 0.15% improvement and/or sanding may make 10% improvement when the route conditions can only support 25-30% adhesion.

A failure status of the starting operation may be inferred from, for example, an axle not making TE out of the expected levels (due to cut out or failure), cutout status, engine shut down, and/or any engine issue which prevents it from making the making the expected TE.

The starting operation may be improved by calculating acceleration of each propulsion-generating vehicle, for example by using its own speed sensors, GNSS receiver, accelerometers, and/or drawbar sensors. The acceleration may be calculated from readings from the sensors or may be estimated based on TE and movement.

The starting operation may incorporate movement detection. This may include movement of any sensed location, for example propulsion-generating vehicles in the vehicle system and/or EOV. Knowledge of the movement information as well as the exact amount (position change, speed) and timing of the movement may be used to determine which portion of the vehicle system is moving and to determine the slack conditions and to determine the success of the starting operation as well as to determine an amount of acceleration, TE, and/or speed change needed.

Additional information may be considered in determining the starting operation. For example, a history or histories of similar vehicle systems and/or similar locations may be considered. A slack state of the vehicle system may be considered. Other information available from vision-based movement detectors, for example forward and/or reverse vehicle cameras, downward and/or sideways facing cameras, and/or axle counters in any of the locations in the vehicle or wayside may be used to determine and/or control the starting operation. One or more of the controllers may use algorithms to process images obtained to provide information on the status of the starting operation.

In one embodiment, the starting operation may incorporate operation of appropriate devices, such as manual and/or automatic sanders in various locations on the vehicle system, and/or operation of other conditioning systems, such as an advance rail cleaner and/or operation of a bell and/or a horn or a visual movement indicator. The starting operation maybe conducted with limited GNS and/or communication capabilities in one or more vehicles in the vehicle system.

The starting operation may control the speed of the vehicle system along an S curve or a linear curve for transitioning to speed control once the starting operation is completed. The starting operation may include a planned TE call with closed loop regulation. A position regulator with and without reduction or adjustment in TE maybe used during the starting operation.

The starting operation can be incorporated into an existing vehicle system. Suitable vehicle systems may include, for example, a freight train or a passenger train. Suitable trains may have a combination of cars, consists, locomotives, and/or locomotive positions within the train.

Regulation of the vehicle system may be done by regulating the vehicle system at a low speed until the entire vehicle system is moving, then switching to regulating acceleration (mph/min), and at a pre-determined speed switch back to standard regulation, allowing for a new speed control operation to occur at the transition speed.

Other vehicle system feedbacks can be used to modify the starting process such as EOV feedback, including movement detection, and EOV brake pipe pressure, or change in pressure. Additionally, or alternatively, other data sources, such as vehicle system makeup, position of the vehicle system on terrain, brake state including powered vehicle air brakes, non-powered vehicle air brakes, handbrakes, and whether they are set, applying, released, releasing, can alter the starting operation.

One or more controllers of one or more vehicles may control each of the independent air brakes, the non-propulsion-generating vehicle air brakes, and bail commands. The one or more controllers may control when and how to release the propulsion-generating vehicle air brakes and the non-propulsion-generating vehicle air brakes. The operator (e.g., engineer) may be informed of the status of the various brakes through, for example, a display of the output device.

The operator may be prompted to perform an action, for example to release a handbrake, through the display of the output device.

Figure 4:
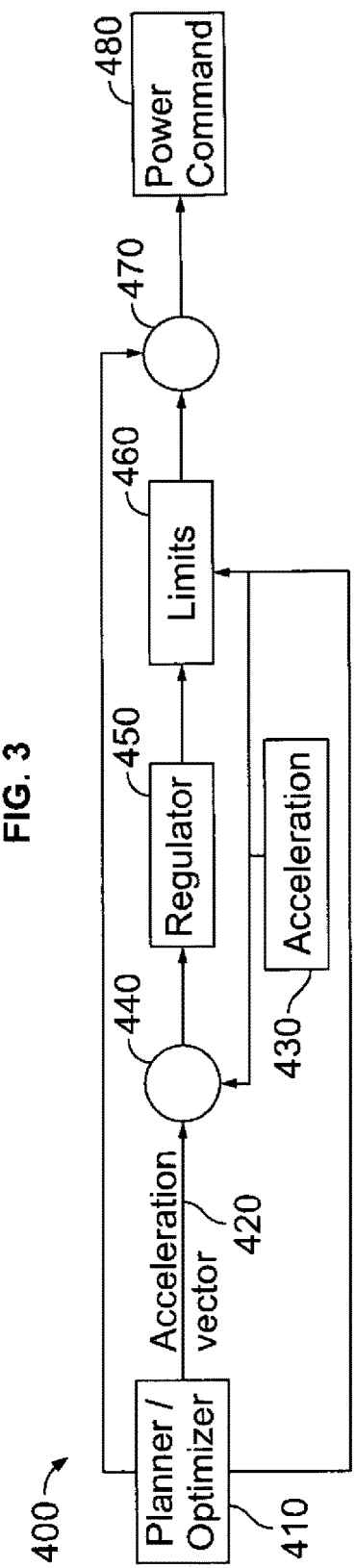
FIG. 4 schematically illustrates a system configured to control a starting operation of a vehicle system according to one embodiment.

Referring to FIG. 4, in one embodiment a system 400 to control a starting operation of a vehicle system may include a controller 410. The controller may be located on one or more of the vehicles and executed through one or more sub-controllers of the one or more vehicles. The controller may determine starting parameters and then regulate the operation of the vehicle system according to a plan. The plan may be performed to optimize any of but not limited to the following: acceleration; position at a time window; velocity at a time window; coupler(s) force profile during starting; coupler(s) force transitions. The controller then may regulate the vehicle system to an acceleration, a position, or a speed.

The controller may plan to utilize all possible control parameters including:

Distributed power controllers for individual control of propulsion-generating vehicles may balance forces within the vehicle system and allow for individual pushing or pulling per individual propulsion-generating vehicle. This allows for individual application of independent airbrakes per propulsion-generating vehicle, and timed release of vehicle airbrakes, allowing for transitioning of release in front and later release in back, or vice versa. This allows for application and release of individual handbrakes at timed intervals or in coordination with tractive effort application per propulsion-generating vehicle.

Utilizing ECP airbrakes during starting can plan for and execute individual vehicle brakes to manipulate reduction or minimization of individual coupler forces within the vehicle system and coordinate with TE application per propulsion-generating vehicle within the vehicle system. The controller may identify failure to start scenarios, thus preventing starting or preventing unsafe starts, unless the failure identification is resolved.

Referring again to FIG. 4, the controller may plan or optimize the starting operation based on one or more of a time to reach a determined distance, changes in power (e.g., changes in throttle or notch position), a maximum value of absolute coupler force in every coupler, or a velocity at a determined distance. The controller may generate an acceleration rate or vector 420 for a period or window for each consist within the train. The acceleration rate or vector is compared to an acceleration 430 of the propulsion-generating vehicle group by a comparator 440. An acceleration regulator 450 provides individual control per propulsion-generating vehicle group and coupler force regulation by controlling each propulsion-generating vehicle individually within limits 460. The limits are compared by a comparator 470 to the trip plan from the controller. Consequently, the controller may generate a position versus time, for example utilizing axle/wheel feedback, and provide a power command 480 to regulate for relative position or propulsion-generating vehicle power (e.g., throttle or notch setting) versus time.

The controller may control the starting operation based on one or more conditions. The conditions may include time window to a distance (for example a distance of 1000 feet in 30 to 90 seconds). Another condition may be a position window to a time (for example a distance of 500 to 1500 feet in 60 seconds). A further condition may be the reduction or minimization of a maximum coupler force, and/or a ratio of maximum over capability of coupler forces, and/or reduction or minimization of coupler force sign changes. The controller may have a programmed TE/BE (brake effort) change as a function of propulsion-generating vehicle position and air brake (A/B) propagation time as a condition of the starting operation. The air brake release from specific propulsion-generating vehicle positions as a function of time (for example only lead, only mid remote, only trail remote followed by lead) may be a condition of the starting operation. A programmed air brake release from a specific propulsion-generating vehicle as a function of time and/or position may be a starting operation condition. A programmed air brake release as a function of non-propulsion-generating vehicle/propulsion-generating vehicle position in an ECP brake system, including for slack control, may be a further condition of the starting operation. The controller may use zero DB modem data as a condition of the starting operation.

For the starting operation, the controller may generate a position plan, an acceleration plan, and/or a warning if the starting operation is not going to be successful. The controller may generate a starting slack state of the train (e.g., a bunched state of the vehicles of the vehicle system).

During the starting operation, the controller may regulate a position, acceleration, a constant acceleration, and/or an acceleration clamped to a trip plan of the controller. The controller may replan the trip once a certain speed is achieved during the starting operation.

The controller may begin the starting operation under various slack states and terrain, including an unknown slack state, a stretched/uphill vehicle system configuration, a stretched/downhill configuration, a stretched/undulating configuration, a bunched/uphill configuration, a bunched/downhill configuration, or a bunched/undulating configuration.

The controller may control the starting operation to ease the vehicle system to a known slack state before starting using DP operations. The controller may determine when the slack is taken care of by determining a position, a speed, and/or an acceleration of all propulsion-generating vehicles and the EOV. The controller may further determine and remember a slack state from the last stop (either manual or automatic).

The controller may provide an indication, for example through the output device, to the operator to release a handbrake. The controller may provide a timed TE application (e.g., apply a lead unit notch and a delayed notch for DP based on time and/or an A/B signal being received). The controller may provide the operator or other personnel to perform a departure test function and may allow the departure test function result to be input into the starting operation, for example through the input device. The controller may receive confirmation from all DP and communication units (e.g., DB modems) to determine a time for A/B propagation.

The controller may generate acceleration as a function of position or time. The acceleration may be one vector for the propulsion-generating vehicle groups, or multiple vectors for each group of propulsion-generating vehicles, or multiple vectors for each propulsion-generating vehicle, or multiple vectors for propulsion-generating vehicles and non-propulsion-generating vehicles or EOV. The regulator may regulate acceleration of one or more propulsion-generating vehicles to be with in an acceptable limit to generate the power command to be distributed to one or more propulsion-generating vehicles independently or synchronously. The regulator may control the vehicle system as a function of time or as a function of position. It may replan the trip if an error is becoming unacceptable. Acceleration may be shown but the regulator may control the vehicle system to a position or time to a specified position or speed at certain positions or coupler force at specified locations in the vehicle system.

Figure 5:
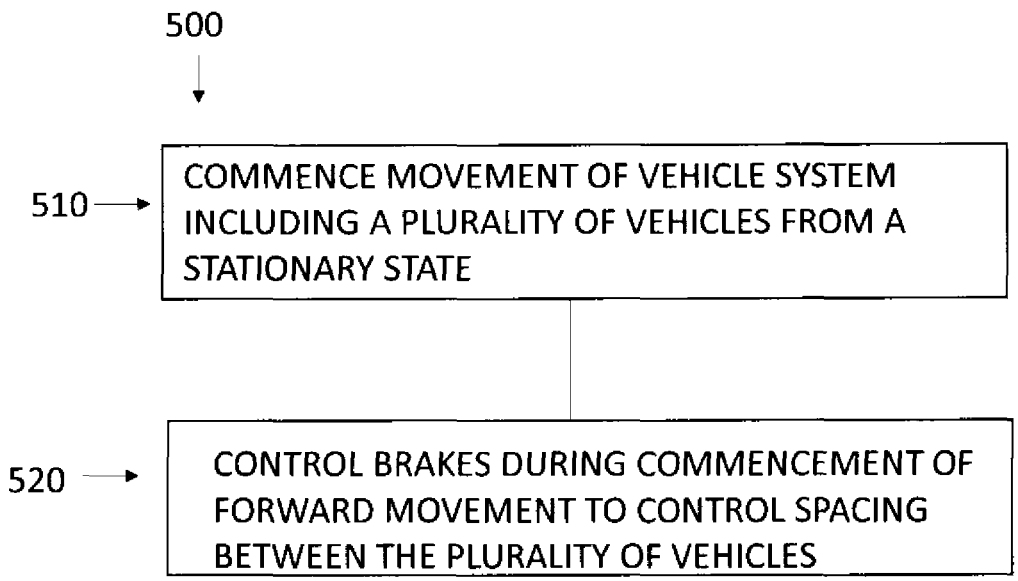
FIG. 5 schematically illustrates a method of controlling a vehicle system according to one embodiment.

Referring to FIG. 5, a method 500 includes at step 510 commencing movement at of a vehicle system including a plurality of vehicles from a stationary state. The method further at step 520 includes controlling brakes during the commencement of movement of the vehicle system from the stationary state to control spacing between the plurality of vehicles of the vehicle system.

Figure 6:
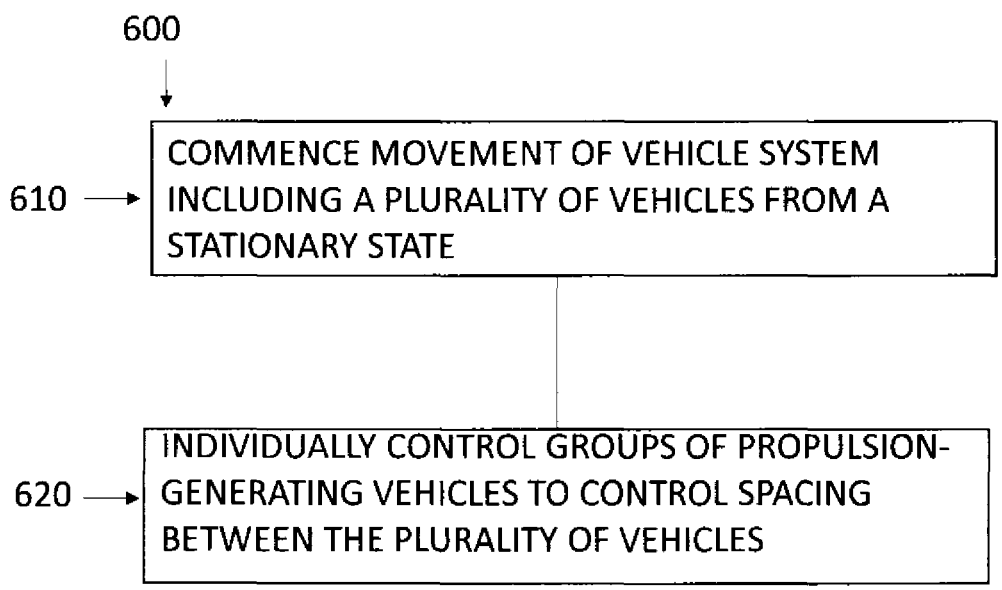
FIG. 6 schematically illustrates a method of controlling a vehicle system according to one embodiment.

Referring to FIG. 6, a method 600 includes at step 610 commencing movement of a vehicle system including a plurality of vehicles from a stationary state. The method further includes at step 620 individually controlling groups of propulsion-generating vehicles of the vehicle system during the commencement of the movement of the vehicle system to control spacing between the plurality of vehicles of the vehicle system.

Figure 7:
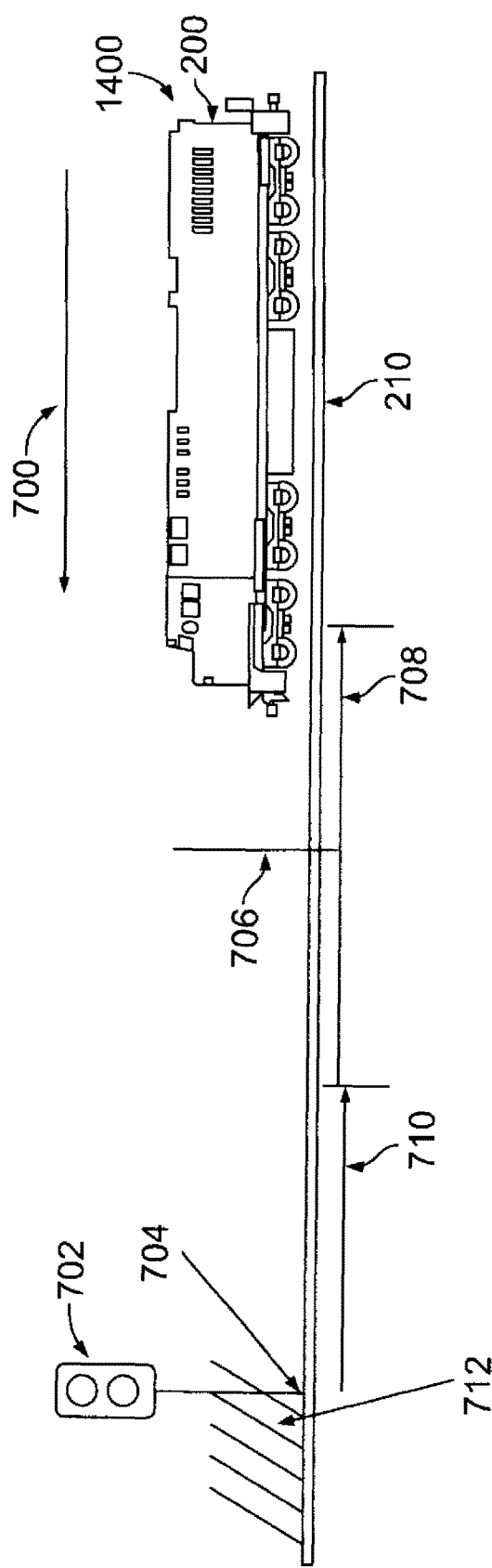
FIG. 7 schematically illustrates a system and method for controlling a vehicle system according to one embodiment.

Referring to FIG. 7, a vehicle system may travel in a direction of interest or intended direction 700 on a route having a stopping location or system stop location 704 at which the vehicle system is to stop. A signal stop 702 may be collocated at the system stop location. The controller may prevent the vehicle system from entering an area 712 that is past the system stop location. The controller may stop the vehicle system so that a vehicle or vehicles, or a portion or portions thereof, of the vehicle system are stopped at a designated stop location(s) 706. The designated stop location(s) may be a fueling station(s) where a specific propulsion-generating vehicle(s) of the vehicle system need to be positioned. The designated stop location(s) may be a charging station(s) for charging systems of the vehicles of the vehicle system. The designated stop location(s) may be for pick-up and/or set-out where a vehicle or vehicles of the vehicle system need to be positioned for addition to or removal from the vehicle system. Additional secondary systems can be used to determine other designated stop locations or system stop locations, such as Positive Train Control systems or a cab signal. In one embodiment, the designated stop location(s) may not be located relative to the front or back of the vehicle. Rather, the designated stop location(s) may be relative to any position of any vehicle of the vehicle system, for example a third vehicle in a train may need to be stopped for fueling or a fifth vehicle may need to stop for electrical charging connection with a charging connector that is 10 meters behind the front end of the fifth vehicle. In these examples, tolerances in both directions may be required and the designated stop location(s) may be selected or determined relative to the system stop location.

The designated stop location(s) may be calculated as a discernable position within a stopping zone(s) 708. The controller may determine the designated stop location(s) within the stopping zone(s) to provide a margin(s) 710 between the system stop location and the designated stop location(s). The system stop location can be provided or may be computed for a specific location. During operation, the system stop location is set to ensure that the vehicle system can come to a stop at the designated stop location(s). A distance to stop is based on several factors. These factors may include the speed of the vehicle system, the weight of the vehicle system (including whether it is a loaded or unloaded weight), the environmental conditions (rain, snow, dry, etc.), and the like. The controller may determine a maximum speed at which to begin braking with additional factors, such as efficiency (to allow the vehicle system to come in as fast as possible as close as possible but without overshooting) or stress on components (to allow the vehicle system to coast in starting from a further distance away).

Figure 8:
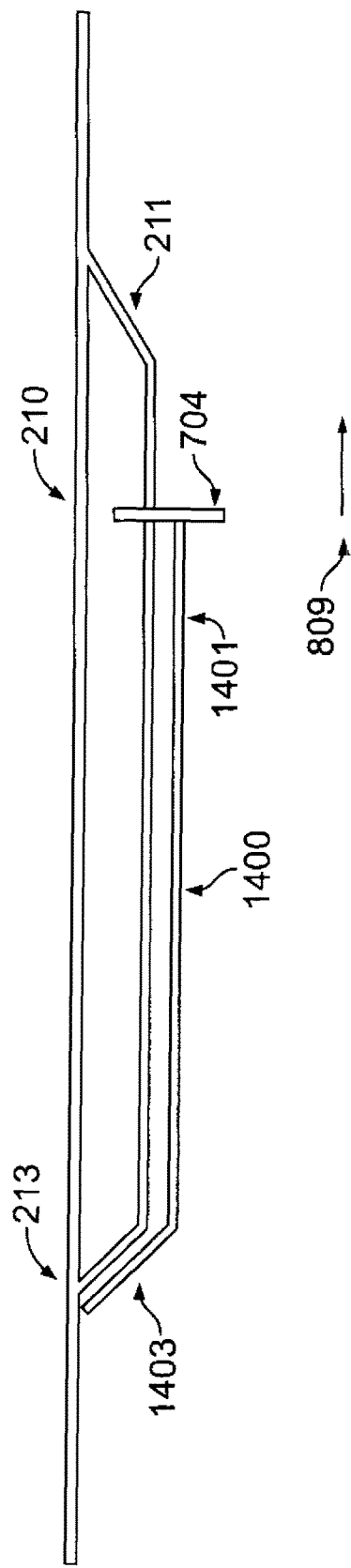
FIG. 8 schematically illustrates a system and method for controlling a vehicle system according to one embodiment.

Continuing, and with reference to FIG. 8, in determining the system stop location, additional stopping location factors for the lead vehicle of the vehicle system may be taken into account. For example, where a front 1401 of the vehicle system may stop relative to an end 1403 of the vehicle system may be taken into account. The controller may adjust an initial system stop location to allow the end of the vehicle system to be moved so that the end of the vehicle system does not block an intersection 213 of a route 211 that branches off from the route. If the initial system stop location would result in the end of the vehicle system blocking the intersection, the controller can adjust the initial system stop location in a direction 809 so that the front of the vehicle system is moved forward enough to prevent the end of the vehicle system from blocking the intersection. The controller can determine the location of the end of vehicle system using, for example, distance counters, EOV devices with location devices (e.g., GNSS receiver), EOV DP propulsion-generating vehicles with location devices, imaging data provided by the last and/or intermediate vehicles of the vehicle system. The controller can also use additional data to determine the location of the end of the vehicle system from those devices, including, for example time stamps transport lag, and direction of travel. For example, a distance counter can be set to allow determination of how far the front of the vehicle system has traveled since the stop target has been reset. Location data (e.g., GNSS data) at the end of the vehicle system can be transmitted to the front of the vehicle system that indicates the location of the end of the vehicle system. As another example, camera signals can be sent from the end of the vehicle system to the front of the vehicle system using landmarks to determine the location.

Figure 9:
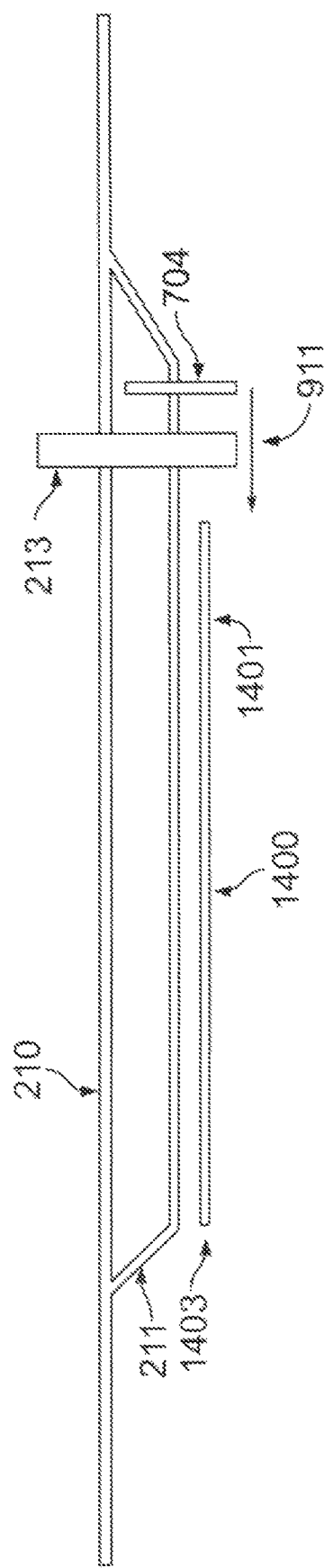
FIG. 9 schematically illustrates a system and method for stopping a vehicle system according to one embodiment.

Referring to FIG. 9, the controller may adjust the initial system stop location to prevent blocking of a crossing 213 or fouling of a switch. If the initial system stop location would result in the front of the vehicle system blocking the crossing or fowling a switch, the controller may move the initial system stop location in a direction 911 that moves the system stop location before the crossing or the switch. The position of the system stop location can be determined from, for example, route database features, or camera signals. The initial system stop location can be moved forward or backwards in order to avoid fowling a switch or blocking a crossing. The initial system stop location may also be adjusted to provide incremental slack state changes in couplers of the vehicle system.

The controller may generate a power plan and speed profile indicative of stopping the vehicle system at the system stop location. Speed profiles and system stop locations may be generated by one or more processes or separate systems from the controller. System stop locations can be placed anywhere regardless of terrain, vehicle system makeup, vehicle system size, and the controller may determine a slack state (e.g., stretched, bunched, intermediate) to stop the vehicle system in, and what brakes to use to stop the vehicle system (e.g., automatic, independent, dynamic), and subsequently what brakes to apply including parking brakes in order to park the vehicle system after stopping, all before passing the system location. The controller may activate additional peripherals (e.g., horns, bells, flashers, signals) required when stopping the vehicle system.

The controller may stop the vehicle system using the generated power plan, vehicle system makeup information, position data (e.g., GNSSS data, track switches), DP control, and airbrakes (automatic and independent) in order to stop the vehicle system with a desired slack state (e.g., bunched, stretched), within a determined or configurable tolerance of the system location. The controller may use a reverse S or exponential or some other type of stopping profile curve to bring the vehicle system to a stop.

The controller may regulate the vehicle system speed to a stop while controlling the individual coupler forces during stopping events to be below yield thresholds to prevent vehicle system breaks.

Figure 10:
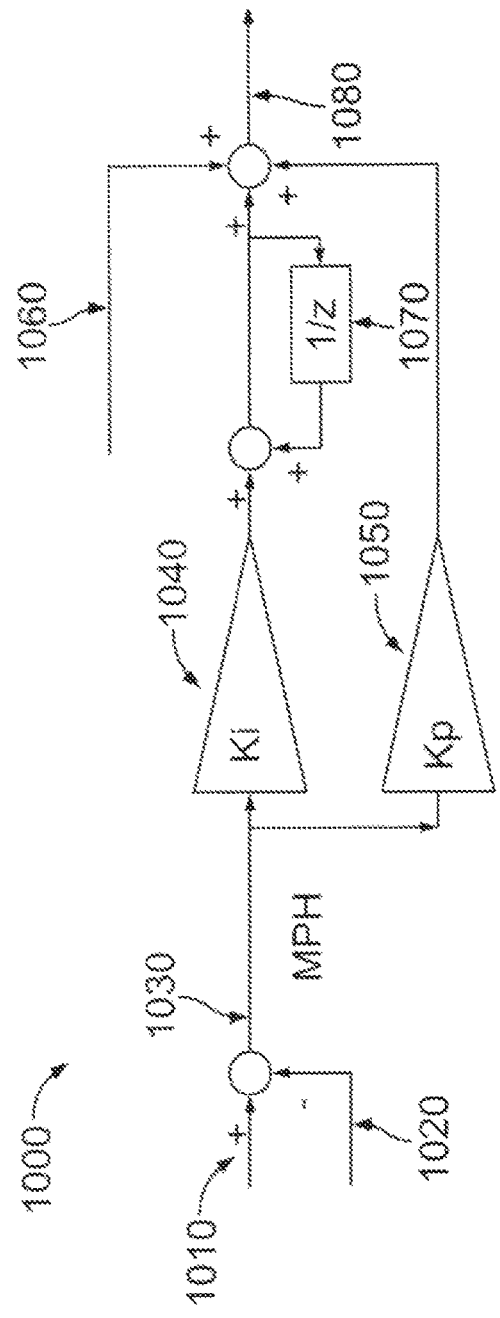
FIG. 10 schematically depicts a controller for controlling a lead vehicle of a vehicle system according to one embodiment.

Referring to FIG. 10, the controller may regulate a lead propulsion-generating vehicle of the vehicle system to a stop using a position loop controller wrapped around a speed regulator. The controller can use available options to determine an actual position of the lead propulsion-generating vehicle, including for example GNSS data, tachometers, and axle/locomotive derated data. A controller 1000 may determine an error 1030 between a speed command signal 1010 and a speed feedback signal 1020. The error is provided to amplifiers 1040, 1050 of a PI control of the controller that includes a tuner 1070 for zeroing the integral gain. The output of the PI controller is added to a feed forward command 1060 to produce the output power command 1080 of the controller.

The controller may keep the operator of the vehicle system informed of the slowing/stopping status, and problems occurring while being controlled during the stopping sequence by providing information to the operator during the stopping process. The information provided to the operator may include any potential failure possibilities or how much error may be expected in the stopping position as well as actions the operator may need to take. The information provided to the operator may include each action being taken, for example application of automatic brakes, independent brake applications, throttle settings (notch position) for each propulsion-generating vehicle, while providing the operator the ability to resume manual control at any time. The controller may also monitor the stopping process once initiated and limit the number of reasons to return to manual control due to system failures, as long as airbrake control is maintained.

The controller may also confirm or inform about, for example, axle cutout status, engine shut down status, adhesion/slide limitations and rail condition status (e.g., sanding, wayside lubrications) or anything that may affect stopping. The controller may also continuously monitor the propulsion-generating vehicles to determine if a tractive effort is outside of expected levels.

Figure 11:
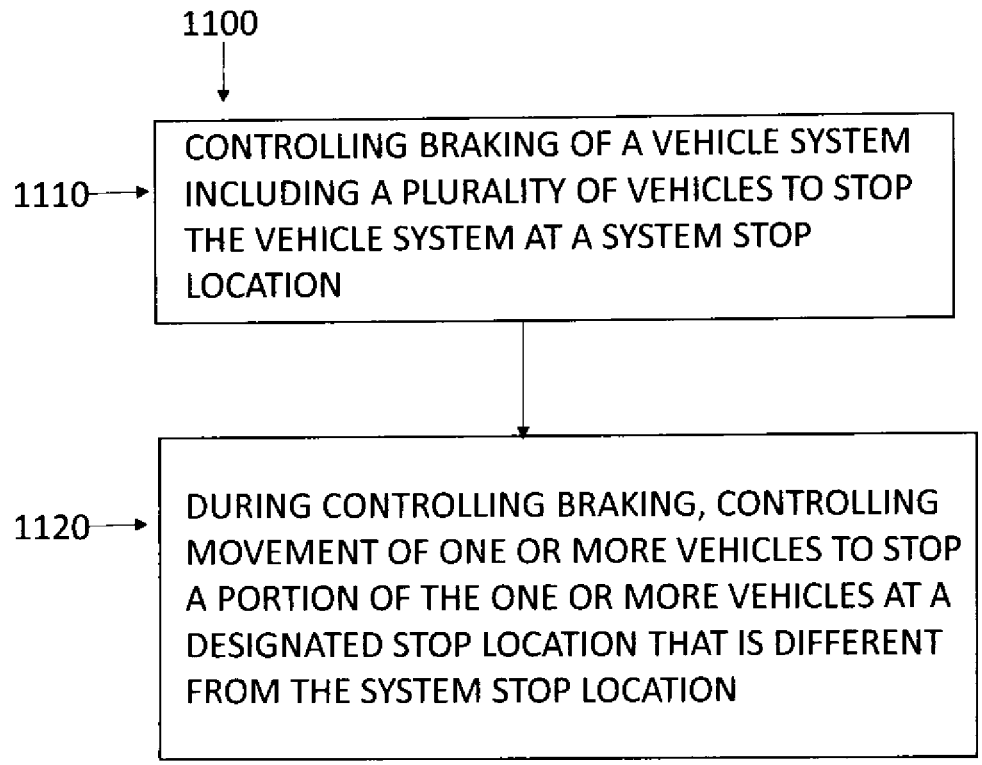
FIG. 11 schematically illustrates a method of controlling a vehicle system according to one embodiment.

Referring to FIG. 11, a method 1100 includes at step 1110 controlling braking of a vehicle system including a plurality of vehicles to stop the vehicle system at a system stop location. The method further includes at step 1120, during controlling the braking to stop the vehicle system, controlling movement of one or more of the vehicles to stop a portion of the one or more vehicles at a designated stop location that is different from the system stop location.

Figure 12:
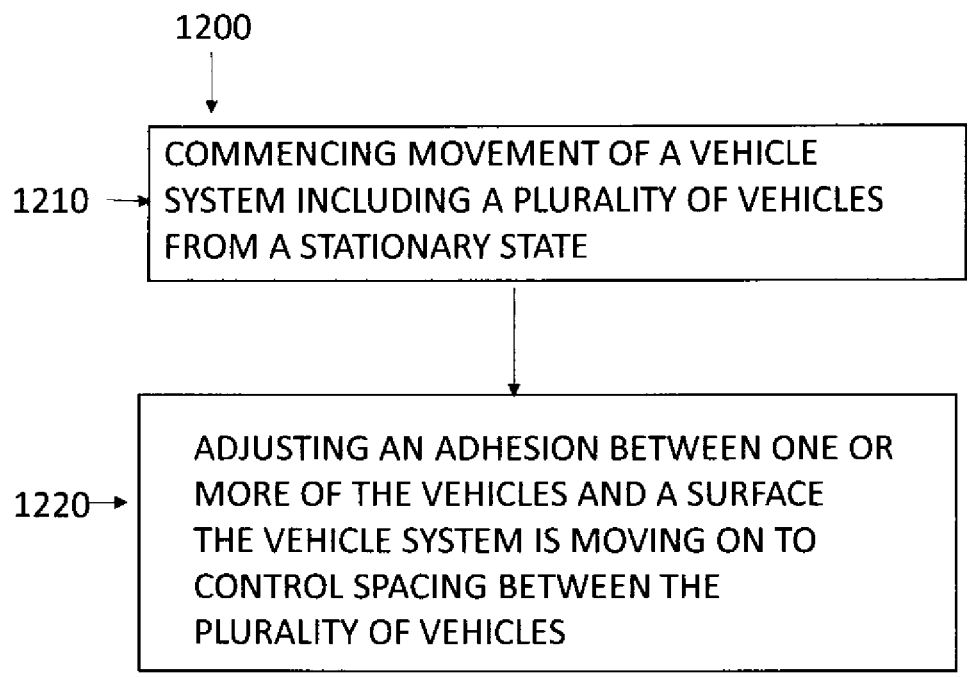
FIG. 12 schematically illustrates a method of controlling a vehicle system according to one embodiment.

Referring to FIG. 12, a method 1200 includes at step 1210 commencing movement of a vehicle system including a plurality of vehicles from a stationary state. The method further includes at step 1220 adjusting an adhesion between one or more of the vehicles and a surface the vehicle system is moving on to control spacing between the plurality of vehicles of the vehicle system.

In one embodiment, the controller of the vehicle system may have a local data collection system deployed that may use machine learning to enable derivation-based learning outcomes. The controller may learn from and make decisions on a set of data (including data provided by the various sensors), by making data-driven predictions and adapting according to the set of data. In embodiments, machine learning may involve performing a plurality of machine learning tasks by machine learning systems, such as supervised learning, unsupervised learning, and reinforcement learning. Supervised learning may include presenting a set of example inputs and desired outputs to the machine learning systems. Unsupervised learning may include the learning algorithm structuring its input by methods such as pattern detection and/or feature learning. Reinforcement learning may include the machine learning systems performing in a dynamic environment and then providing feedback about correct and incorrect decisions. In examples, machine learning may include a plurality of other tasks based on an output of the machine learning system. In examples, the tasks may be machine learning problems such as classification, regression, clustering, density estimation, dimensionality reduction, anomaly detection, and the like. In examples, machine learning may include a plurality of mathematical and statistical techniques. In examples, the many types of machine learning algorithms may include decision tree based learning, association rule learning, deep learning, artificial neural networks, genetic learning algorithms, inductive logic programming, support vector machines (SVMs), Bayesian network, reinforcement learning, representation learning, rule-based machine learning, sparse dictionary learning, similarity and metric learning, learning classifier systems (LCS), logistic regression, random forest, K-Means, gradient boost, K-nearest neighbors (KNN), a priori algorithms, and the like. In embodiments, certain machine learning algorithms may be used (e.g., for solving both constrained and unconstrained optimization problems that may be based on natural selection). In an example, the algorithm may be used to address problems of mixed integer programming, where some components restricted to being integer-valued. Algorithms and machine learning techniques and systems may be used in computational intelligence systems, computer vision, Natural Language Processing (NLP), recommender systems, reinforcement learning, building graphical models, and the like. In an example, machine learning may be used for vehicle performance and behavior analytics, and the like.

In one embodiment, the controller may include a policy engine that may apply one or more policies. These policies may be based at least in part on characteristics of a given item of equipment or environment. With respect to control policies, a neural network can receive input of a number of environmental and task-related parameters. These parameters may include an identification of a determined trip plan for a vehicle group, data from various sensors, and location and/or position data. The neural network can be trained to generate an output based on these inputs, with the output representing an action or sequence of actions that the vehicle group should take to accomplish the trip plan. During operation of one embodiment, a determination can occur by processing the inputs through the parameters of the neural network to generate a value at the output node designating that action as the desired action. This action may translate into a signal that causes the vehicle to operate. This may be accomplished via back-propagation, feed forward processes, closed loop feedback, or open loop feedback. Alternatively, rather than using backpropagation, the machine learning system of the controller may use evolution strategies techniques to tune various parameters of the artificial neural network. The controller may use neural network architectures with functions that may not always be solvable using backpropagation, for example functions that are non-convex. In one embodiment, the neural network has a set of parameters representing weights of its node connections. A number of copies of this network are generated and then different adjustments to the parameters are made, and simulations are done. Once the output from the various models are obtained, they may be evaluated on their performance using a determined success metric. The best model is selected, and the vehicle controller executes that plan to achieve the desired input data to mirror the predicted best outcome scenario. Additionally, the success metric may be a combination of the optimized outcomes, which may be weighed relative to each other.

The controller can use this artificial intelligence or machine learning to receive input (e.g., a location or change in location), use a model that associates locations with different operating modes to select an operating mode of the one or more functional devices of the HOV unit and/or EOV unit, and then provide an output (e.g., the operating mode selected using the model). The controller may receive additional input of the change in operating mode that was selected, such as analysis of noise or interference in communication signals (or a lack thereof), operator input, or the like, that indicates whether the machine-selected operating mode provided a desirable outcome or not. Based on this additional input, the controller can change the model, such as by changing which operating mode would be selected when a similar or identical location or change in location is received the next time or iteration. The controller can then use the changed or updated model again to select an operating mode, receive feedback on the selected operating mode, change or update the model again, etc., in additional iterations to repeatedly improve or change the model using artificial intelligence or machine learning.

In one or more embodiments, a method may include commencing movement of a vehicle system that includes a plurality of vehicles from a stationary state. The method may include controlling one or more brakes of the vehicle system during the commencement of movement of the vehicle system from the stationary state to control spacing between the plurality of vehicles of the vehicle system.

Optionally, the method may include controlling the one or more brakes to control a slack state of one or more couplers mechanically coupling the plurality of vehicles of the vehicle system.

Optionally, the method may include monitoring locations of different segments of the vehicle system. Each of the different segments may include one or more different vehicles of the plurality of vehicles. Relative movement between the different segments may be identified based on the locations that are monitored. A slack state of one or more couplers mechanically coupling the plurality of vehicles of the vehicle system may be determined based on the relative movement of the different segments.

Optionally, the method may include changing an amount of propulsion generated in one or more different segments of the vehicle system based on the slack state.

Optionally, operation of the one or more brakes of the vehicle system may be controlled to control an amount of adhesion between one or more of the plurality of vehicles and a route along which the vehicle system is configured to move based on the slack state.

Optionally, the method may include controlling the one or more brakes based on a history of controlling brakes of one or more other vehicle systems having one or more of a same number of propulsion-generating vehicles, a same number of non-propulsion-generating vehicles, a same arrangement of propulsion-generating vehicles and non-propulsion-generating vehicles, or a same weight distribution as the vehicle system.

Optionally, the method may include controlling the one or more brakes based on a history of one or more other vehicle systems one or more of moving along a same route or disposed at a same location as the vehicle system.

In one or more embodiments, a method may include commencing movement of a vehicle system including a plurality of vehicles from a stationary state. The plurality of vehicles may be arranged in one or more groups of propulsion-generating vehicles. The method may include individually controlling the one or more groups of propulsion-generating vehicles of the vehicle system during the commencement of the movement of the vehicle system to control spacing between the plurality of vehicles of the vehicle system.

Optionally, the method may include commencing movement of the one or more groups of propulsion-generating vehicles at different times to control spacing between the plurality of vehicles.

Optionally, the method may include commencing movement of the one or more groups of propulsion-generating vehicles at one or more of different speeds or different accelerations.

Optionally, the method may include monitoring locations of different segments of the vehicle system, each of the different segments including one or more different vehicles of the plurality of vehicles. Relative movement between the different segments may be identified based on the locations that are monitored. A slack state of couplers mechanically coupling the plurality of vehicles of the vehicle system may be determined based on the relative movement of the different segments.

Optionally, the method may include individually controlling the one or more groups of propulsion-generating vehicles to control a slack state of couplers mechanically coupling the plurality of vehicles of the vehicle system.

Optionally, the method may include individually controlling the one or more groups of propulsion-generating vehicles based on a history of one or more of controlling one or more other vehicle systems or the one or more other vehicle systems being at a similar starting location.

Optionally, the method may include controlling operation of the one or more groups of propulsion-generating vehicles to control an amount of adhesion between one or more of the plurality of vehicles of the vehicle system and a surface along which the vehicle system is configured to move.

In one or more embodiments, a vehicle control system may include one or more processors that may control operation of brakes of a vehicle system including a plurality of vehicles to commence movement of the vehicle system. The processors may control operation of the brakes to control spacing between the plurality of vehicles of the vehicle system.

Optionally, the processors may control operation of the brakes to control a slack state of one or more couplers mechanically coupling the plurality of vehicles of the vehicle system.

Optionally, the processors may control operation of one or more propulsion systems of the vehicle system to control an amount of propulsion that may be generated by one or more propulsion-generating vehicles of the vehicle system.

Optionally, the processors may control the brakes based on a history of controlling brakes of one or more other vehicle systems having one or more of a same number of propulsion-generating vehicles, a same number of non-propulsion-generating vehicles, a same arrangement of propulsion-generating vehicles and non-propulsion-generating vehicles, or a same weight distribution as the vehicle system.

Optionally, the plurality of vehicles may be arranged in one or more groups. The one or more processors may commence movement of the one or more groups of the plurality of vehicles at different times to control spacing between the plurality of vehicles.

Optionally, the processors may control operation of one or more of the brakes or propulsion systems of the vehicle system to control an amount of adhesion between one or more of the plurality of vehicles of the vehicle system and a surface along which the vehicle system is configured to move.

A method may include commencing movement of a vehicle system including a plurality of vehicles from a stationary state and controlling brakes during the commencement of movement of the vehicle system from the stationary state to control spacing between the plurality of vehicles of the vehicle system.

Optionally, controlling the brakes provides a determined slack state of one or more couplers mechanically coupling the vehicles of the vehicle system.

Optionally, the method may further include monitoring locations of different segments of the vehicle system, identifying relative movement between the different segments based on the locations that are monitored, and determining a slack state of couplers of the vehicle system based on the relative movement of the different segments.

Optionally, the method may further include changing propulsion generated in one or more segments of the vehicle system based on the slack state that is determined.

Optionally, the method may further include controlling one or more adhesion-modifying devices based on the determined slack state.

Optionally, controlling the brakes includes controlling the brakes based on a history of controlling brakes of one or more other vehicle systems having one or more of a same number of propulsion-generating vehicles, a same number of non-propulsion-generating vehicles, a same arrangement of propulsion-generating vehicles and non-propulsion-generating vehicles, or a same weight distribution as the vehicle system.

Optionally, controlling the brakes includes controlling the brakes based on a history of one or more other vehicle systems on a same route or a same location as the vehicle system.

Optionally, controlling the brakes includes controlling the brakes based on one or more of position data of one or more vehicles of the vehicle system or communication data in one or more vehicles of the vehicle system.

Optionally, controlling the brakes includes individually controlling brakes of propulsion-generating vehicles of the vehicle system.

A method may include commencing movement of a vehicle system including a plurality of vehicles from a stationary state and during the commencement of the movement of the vehicle system, individually controlling groups of propulsion-generating vehicles of the vehicle system to control spacing between the plurality of vehicles of the vehicle system.

Optionally, individually controlling groups of propulsion-generating vehicles includes commencing movement of the groups of propulsion-generating vehicles at different times.

Optionally, individually controlling groups of propulsion-generating vehicles includes commencing movement of the groups of propulsion-generating vehicles at one or more of different speeds or different accelerations.

Optionally, the method may further include monitoring locations of different segments of the vehicle system, identifying relative movement between the different segments based on the locations that are monitored, and determining a slack state of couplers of the vehicle system based on the relative movement of the different segments.

Optionally, individually controlling groups of propulsion-generating vehicles includes individually controlling groups of propulsion-generating vehicles to provide a determined slack state to couplers mechanically coupling the vehicles of the vehicle system.

Optionally, individually controlling groups of propulsion-generating vehicles includes individually controlling the groups of propulsion-generating vehicles based on a history of one or more similar vehicle systems or one or more similar starting locations.

Optionally, individually controlling groups of propulsion-generating vehicles includes adjusting adhesion between the propulsion-generating vehicles of the vehicle system and a surface that the vehicle system is moving on.

Optionally, individually controlling the groups of propulsion-generating vehicles includes individually controlling the groups based on one or more of position data of one or more vehicles of the vehicle system or communication data in one or more vehicles of the vehicle system.

A method may include controlling braking of a vehicle system including a plurality of vehicles to stop the vehicle system at a system stop location, and during controlling braking to stop the vehicle system, controlling movement of one or more of the vehicles to stop a portion of the one or more vehicles at a designated stop location that is different from the system stop location.

Optionally, the method may further include determining a stopping location of a lead vehicle of the vehicle system and adjusting a position of the system stop location based on the stopping location of the lead vehicle;

Optionally, the method may further include determining a stopping location of a trailing vehicle of the vehicle system and adjusting a position of the system stop location based on the stopping location of the trailing vehicle.

Optionally, the method further includes determining a position of the vehicle system and a maximum speed of the vehicle system to begin braking the one or more vehicles to stop the vehicle system at the system stop location.

Optionally, controlling braking of the vehicle system includes individually controlling brakes of propulsion-generating vehicles of the vehicle system.

A method may include commencing movement of a vehicle system including a plurality of vehicles from a stationary state and adjusting an adhesion between one or more of the vehicles and a surface the vehicle system is moving on to control spacing between the plurality of vehicles of the vehicle system.

Optionally, adjusting the adhesion includes adjusting the adhesion to provide a determined slack state of one or more couplers mechanically coupling the vehicles of the vehicle system.

Use of phrases such as "one or more of . . . and," "one or more of . . . or," "at least one of . . . and," and "at least one of . . . or" are meant to encompass including only a single one of the items used in connection with the phrase, at least one of each one of the items used in connection with the phrase, or multiple ones of any or each of the items used in connection with the phrase. For example, "one or more of A, B, and C," "one or more of A, B, or C," "at least one of A, B, and C," and "at least one of A, B, or C" each can mean (1) at least one A, (2) at least one B, (3) at least one C, (4) at least one A and at least one B, (5) at least one A, at least one B, and at least one C, (6) at least one B and at least one C, or (7) at least one A and at least one C.

As used herein, an element or step recited in the singular and preceded with the word "a" or "an" do not exclude the plural of said elements or operations, unless such exclusion is explicitly stated. Furthermore, references to "one embodiment" of the invention do not exclude the existence of additional embodiments that incorporate the recited features. Moreover, unless explicitly stated to the contrary, embodiments "comprising," "comprises," "including," "includes," "having," or "has" an element or a plurality of elements having a particular property may include additional such elements not having that property. In the appended claims, the terms "including" and "in which" are used as the plain-English equivalents of the respective terms "comprising" and "wherein." Moreover, in the following claims, the terms "first," "second," and "third," etc. are used merely as labels, and do not impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function devoid of further structure.

This written description uses examples to disclose several embodiments of the subject matter, including the best mode, and to enable one of ordinary skill in the art to practice the embodiments of subject matter, including making and using any devices or systems and performing any incorporated methods. The patentable scope of the subject matter is defined by the claims, and may include other examples that occur to one of ordinary skill in the art. Such other examples are intended to be within the scope of the claims if they have structural elements that do not differ from the literal language of the claims, or if they include equivalent structural elements with insubstantial differences from the literal languages of the claims.

What is claimed is:

1. A method comprising:
   commencing movement of a vehicle system including a plurality of vehicles from a stationary state;
   controlling one or more brakes of the vehicle system during the commencement of movement of the vehicle system from the stationary state to control spacing between the plurality of vehicles of the vehicle system; and
   controlling operation of the vehicle system to control an amount of adhesion between one or more of the plurality of vehicles and a surface along which the vehicle system is configured to move based on an adhesion profile.

2. The method of claim 1, further comprising controlling the one or more brakes to control a slack state of one or more couplers mechanically coupling the plurality of vehicles of the vehicle system.

3. The method of claim 1, further comprising:
   monitoring locations of different segments of the vehicle system, each of the different segments including one or more different vehicles of the plurality of vehicles;
   identifying relative movement between the different segments based on the locations that are monitored; and
   determining a slack state of one or more couplers mechanically coupling the plurality of vehicles of the vehicle system based on the relative movement of the different segments.

4. The method of claim 3, further comprising:
   changing an amount of propulsion generated in one or more of the different segments of the vehicle system based on the slack state.

5. The method of claim 3, further comprising:
   controlling operation of the vehicle system to control the amount of adhesion between one or more of the plurality of vehicles and the surface along which the vehicle system is configured to move based on the slack state.

6. The method of claim 1, further comprising controlling the one or more brakes based on a history of controlling brakes of one or more other vehicle systems comprising one or more of:
   a same number of propulsion-generating vehicles,
   a same number of non-propulsion-generating vehicles,
   a same arrangement of propulsion-generating vehicles and non-propulsion-generating vehicles, or
   a same weight distribution as the vehicle system.

7. The method of claim 1, further comprising controlling the one or more brakes based on a history of one or more other vehicle systems one or more of moving along a same route or disposed at a same location as the vehicle system.

8. A method comprising:
   commencing movement of a vehicle system including a plurality of vehicles from a stationary state, the plurality of vehicles arranged in one or more groups of propulsion-generating vehicles;
   individually controlling operation of the one or more groups of propulsion-generating vehicles of the vehicle system during the commencement of the movement of the vehicle system to control spacing between the plurality of vehicles of the vehicle system; and
   controlling operation of the one or more groups of propulsion-generating vehicles to control an amount of adhesion between one or more of the plurality of vehicles of the vehicle system and a surface along which the vehicle system is configured to move based on an adhesion profile.

9. The method of claim 8, further comprising commencing movement of the one or more groups of propulsion-generating vehicles at different times to control spacing between the plurality of vehicles.

10. The method of claim 8, further comprising commencing movement of the one or more groups of propulsion-generating vehicles at one or more of different speeds or different accelerations.

11. The method of claim 8, further comprising:
    monitoring locations of different segments of the vehicle system, each of the different segments including one or more of propulsion-generating vehicles or non-propulsion-generating vehicles;
    identifying relative movement between the different segments based on the locations that are monitored; and
    determining a slack state of couplers mechanically coupling the plurality of vehicles of the vehicle system based on the relative movement of the different segments.

12. The method of claim 8, further comprising individually controlling operation of the one or more groups of propulsion-generating vehicles to control a slack state of couplers mechanically coupling the plurality of vehicles of the vehicle system.

13. The method of claim 8, further comprising individually controlling operation of the one or more groups of propulsion-generating vehicles based on a history of one or more of controlling one or more other vehicle systems or the one or more other vehicle systems being at a similar starting location.

14. A vehicle control system comprising:
one or more processors configured to control operation of a vehicle system to commence movement of the vehicle system, the vehicle system comprising a plurality of vehicles,
wherein the one or more processors are configured to control operation of the vehicle system to control spacing between the plurality of vehicles of the vehicle system, and
wherein the one or more processors are configured to control operation of one or more of brakes or propulsion systems of the vehicle system to control an amount of adhesion between one or more of the plurality of vehicles of the vehicle system and a surface along which the vehicle system is configured to move based on an adhesion profile.

15. The vehicle control system of claim 14, wherein the one or more processors are configured to control operation of brakes of the vehicle system to control a slack state of one or more couplers mechanically coupling the plurality of vehicles of the vehicle system.

16. The vehicle control system of claim 14, wherein the one or more processors are configured to control operation of propulsion systems of the vehicle system to control an amount of propulsion generated by one or more propulsion-generating vehicles of the vehicle system.

17. The vehicle control system of claim 14, wherein the one or more processors are configured to control operation of brakes of the vehicle system based on a history of controlling brakes of one or more other vehicle systems having comprising one or more of:
a same number of propulsion-generating vehicles,
a same number of non-propulsion-generating vehicles,
a same arrangement of propulsion-generating vehicles and non-propulsion-generating vehicles, or
a same weight distribution as the vehicle system.

18. The vehicle control system of claim 14, wherein the plurality of vehicles are arranged in one or more groups, wherein the one or more processors are configured to commence movement of the one or more groups of the plurality of vehicles at different times to control spacing between the plurality of vehicles.

* * * * *